March 16, 1948. C. B. ROHR 2,437,861
SPHYGMOMANOMETERS
Filed June 8, 1944 2 Sheets-Sheet 1
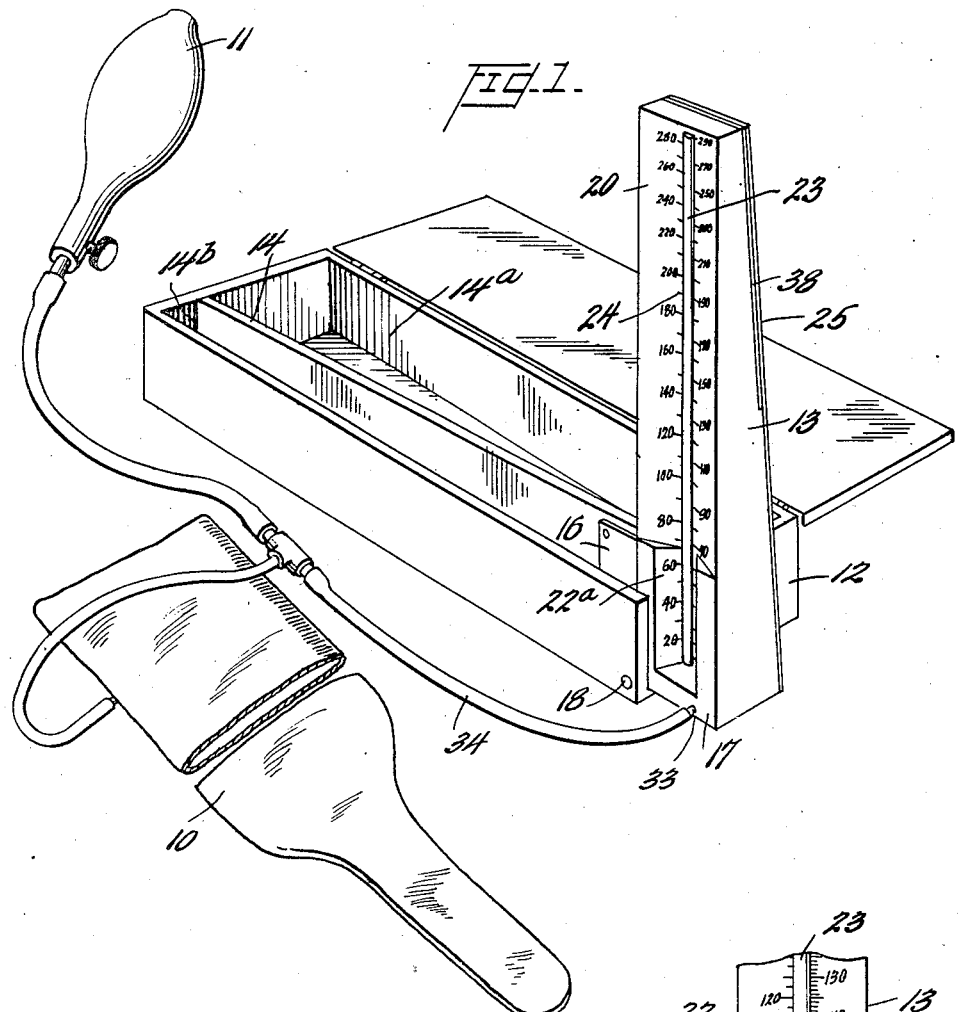
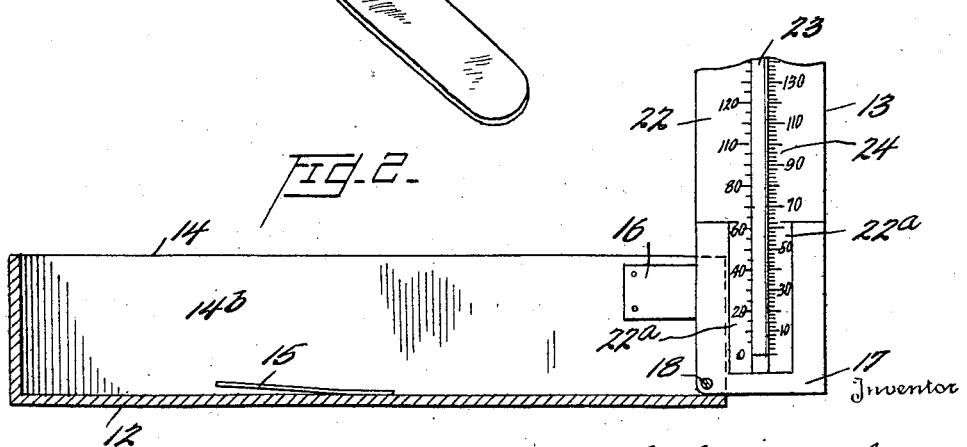
Inventor
Charles B. Rohr
By Watson, Cole, Grindle & Watson
Attorney March 16, 1948. C. B. ROHR 2,437,861
SPHYGMOMANOMETERS
Filed June 8, 1944 2 Sheets-Sheet 2
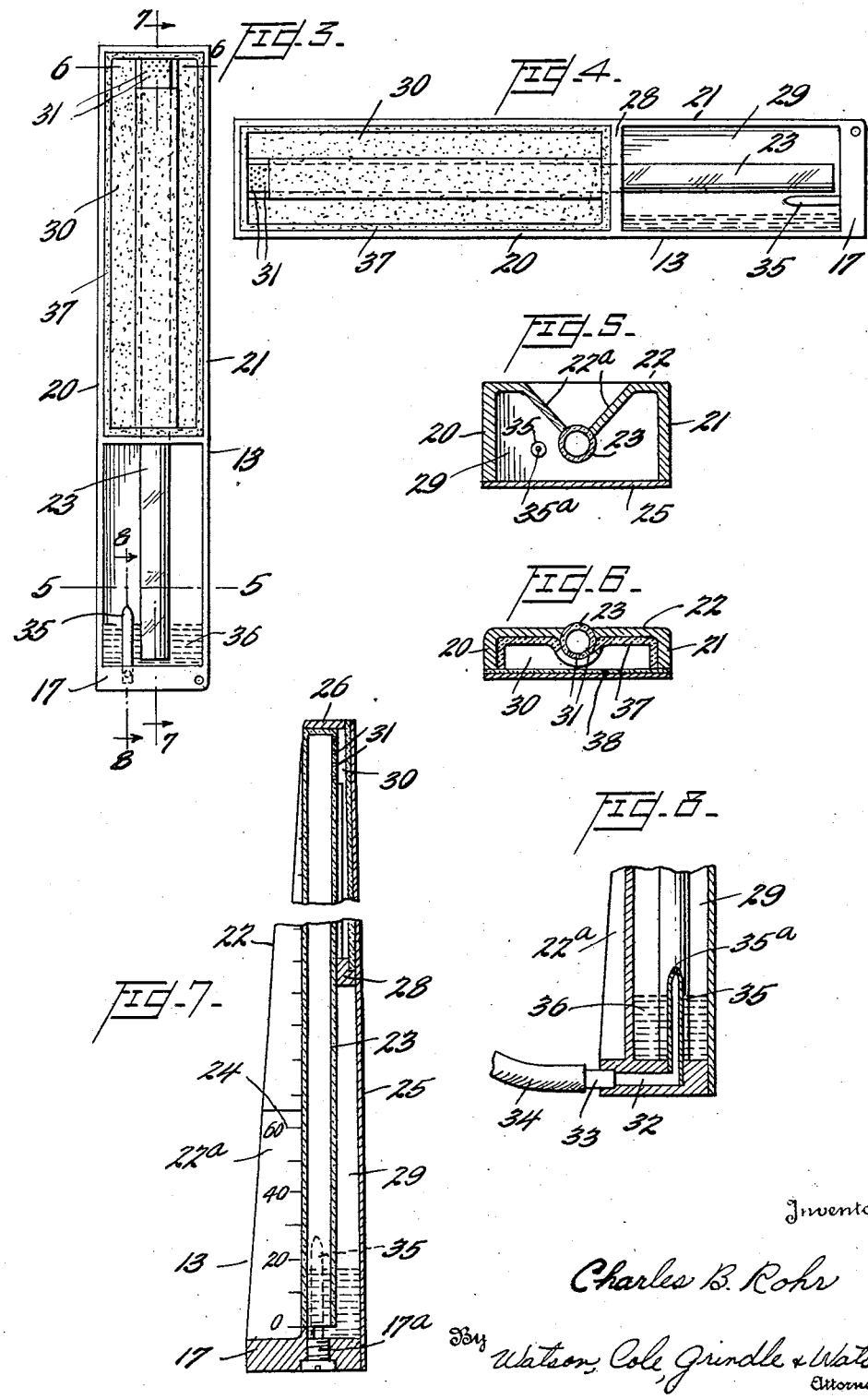
Inventor
Charles B. Rohr
By Watson, Cole, Grindle & Watson
Attorney Patented Mar. 16, 1948

2,437,861

UNITED STATES PATENT OFFICE 2,437,861

SPHYGMOMANOMETERS

Charles B. Rohr, Alum Bridge, W. Va.

Application June 8, 1944, Serial No. 539,316

3 Claims. (Cl. 128—2.05)

The present invention relates to sphygmomanometers, particularly sphygmomanometers of the portable fluid type widely used by practicing physicians.

The typical portable sphygmomanometer comprises essentially an air pump which may conveniently be of the rubber bulb type, a tubular member of rubber or the like which may be wrapped around the arm of a patient, and a mercury column device which includes a tube to be vertically disposed when a reading is to be taken, a graduated scale in close proximity to the tube, a body of mercury, and a mercury chamber in which the mercury body is normally housed when the instrument is not in use and from which chamber the mercury may be forced upwardly in the mercury tube by air pressure being created in the mercury chamber above the surface of the body of mercury therein when the arm band is inflated. Instruments of this type are in universal use and are essential.

Naturally, the instruments must be used under all kinds of conditions, and not only when conditions are favorable, and for that reason should be so designed and constructed that the readings obtained are accurate despite widely varying circumstances and so as to be able to withstand mechanical shock incident to transportation.

It is the object of the present invention to provide an instrument having increased utility, such instrument being of smaller size than instruments of this character now commonly in use, giving it increased convenience, without at the same time sacrificing accuracy. The improved sphygmomanometer is actually so designed and constructed that, despite its decreased size, it has increased accuracy as compared with instruments of the same general type now in common use. Such increased accuracy results in large part by so relatively disposing the mercury tube and the mercury reservoir or chamber that the effect of tilting of the tube from the true vertical, within limits, is minimized, accurate readings being obtained despite slight variations of the tube from the vertical. The instrument is likewise so constructed that the tendency of the mercury column to vertically oscillate when the instrument is in use is minimized. As will be understood by all, vertical oscillations of the mercury column tend to prevent accurate readings and the damping of these vertical oscillations gives the examining physician increased opportunity to accurately determine the position on the graduated scale of the level of the upper surface of the mercury column in the tube.

In accordance with the invention likewise an instrument of most rugged character is provided, such instrument being practically unbreakable when subjected to ordinary use. It is simple in character and may be fabricated at low cost. Not only may it be more conveniently transported by reason of its smaller size, but it may be more conveniently utilized by the examining physician, being so designed that it may be placed close alongside the arm of the patient undergoing examination and in position to be more conveniently inspected by the physician, than has heretofore been possible.

The invention contemplates a novel combination of mercury chamber, tube, air chamber and body of mercury, the arrangement being such that the body of mercury seals the lower end of the mercury tube when the instrument is set up for use and isolates the air chamber from the space in the mercury chamber above the level of the mercury, the air chamber mentioned being connected with the upper end of the mercury tube. The upward movement of the mercury is, therefore, opposed by the confined body of air in the air chamber and, by placing the air chamber to one side of the tube instead of above it, the overall height of the instrument is considerably decreased, the back pressure of the air confined in the air chamber upon the top of the mercury column eliminating the necessity for the use of some portion of the normal mercury column. The mercury chamber, tube, and air chamber, all comprise portions of a tiltable part of the instrument, which part is moved to horizontal position after the instrument has been used, the mercury draining from the tube into the mercury chamber and communication being established between the air chamber and the atmosphere, thus insuring that the pressure and moisture content of the air in the air chamber will be the same as that of the atmosphere when the instrument is next erected for use and avoiding any error due to any such possible variation in pressure.

The invention may be embodied in any one of a number of forms of instruments and in the accompanying drawings one such form or embodiment is illustrated by way of example. One skilled in the art will appreciate, however, that the various changes in the design and arrangement of the component elements of the invention may be made, without departure in principle.

In the drawings:

Figure 1 is a perspective view of the sphygmomanometer, including the arm-encircling band, air pump, calibrated mercury column and casing, the instrument being ready for use;

Figure 2 is a longitudinal section through the casing showing the base or lower portion of the housing for the mercury column, mercury chamber and air chamber;

Figure 3 is a view of this housing from the rear, the back having been removed;

Figure 4 is a similar view, but showing the housing horizontally instead of vertically disposed;

Figure 5 is a section on line 5—5 of Figure 3;

Figure 6 is a section on line 6—6 of Figure 3;

Figure 7 is a section on line 7—7 of Figure 3; and

Figure 8 is a section on line 8—8 of Figure 3.

The tubular arm-encircling band which is indicated at 10 in Figure 1 may be of conventional type and need not be particularly described. Likewise the bulb 11 for creating a greater than atmospheric pressure in the arm band and in the mercury chamber may be of any suitable nature, such flexible tube as may be necessary being also provided. The casing 12 in which the arm band, bulb 11, connecting tubes, and housing 13 are normally enclosed comprises an elongated box having a partition 14 which divides it into two compartments, the larger compartment 14a being for the reception of the arm band, bulb and connecting tubes, and the smaller compartment 14b being for the reception of the housing 13. Partition 14 is slightly inclined to the longitudinal side walls of the open box in order to receive the housing 13 with a snug fit, the housing itself tapering upwardly from its base, as clearly indicated in the drawings. The spring 15 secured to the bottom of the casing 12 in compartment 14b is intended to resiliently support the housing 13 when the housing is disposed in this compartment and a light spring 16 fastened to the vertical face of partition member 14 bears against the rear face of housing 13 and serves to frictionally retard its tilting movements into and out of compartment 14b.

As clearly shown in the drawings, the housing 13 has a relatively thick base portion 17 and this base portion has formed therein, adjacent the lower left-hand corner of the housing, as seen in Figures 1 and 2, a bore or cylindrical recess extending therethrough from front to rear for the reception of a pin 18 one end of which is supported in partition 14 and the other end of which is formed in the forward side wall of the casing 12. The pin 18 comprises a pivot about which the housing 13 may be moved from horizontal position within the compartment 14b to vertical position, as shown in Figures 1 and 2, housing 13 being at all times attached to the box or case 12 but being readily movable from inoperative to operative position and vice versa.

The details of construction of the housing 13 and its contained elements may be more clearly perceived from an inspection of Figures 3 to 8, inclusive. In addition to the thickened base portion 17 the housing includes side walls 20 and 21 disposed in parallel planes and which decrease in width as the distance from the base increases, the housing becoming smaller in cross section as the distance from the base increases. Merging with the side walls 20 and 21 is the front or facing member 22 which, at the upper end of the housing, is substantially flat as indicated in Figure 6 but which, toward the lower end of the housing has reentrant wing walls 22a. The face portion 22 is continuously slotted, however, at its midpoint, from one end to the other, and in this slot there is positioned an elongated tube 23 of transparent material such as glass or clear plastic material which houses the mercury column. The outer surface is inscribed with graduations 24 adjacent the tube 23, in conventional manner, to enable the examining physician to observe the actual height to which the mercury column may have been elevated.

The housing is provided with a back 25 which may be detachably secured to the rear edges of the side wall members 20 and 21, the base 17, and the top 26. A housing thus formed is divided intermediate its ends by a transverse partition 28 into two chambers one of which, indicated at 29, will be hereinafter designated the mercury chamber and the other of which, indicated at 30, is the air chamber. The air chamber 30 is in constant communication with the interior of the tube 23 through a series of relatively minute apertures 31 formed in the upper end of the tube, these apertures permitting the relatively easy flow of air from tube to chamber or in the reverse direction, but being of such size as to prevent movement of mercury from the tube into the chamber at any time.

The base 17 of the mercury chamber is provided with a bore 32 into the outer end of which a short tubular coupling member 33 is inserted, this member being provided for the ready attachment to the housing and to the end of the tube 34 leading from the arm band 10 and pressure bulb 11. The inner end of the duct 32 is in communication with the end of a tubular member 35 which projects from the base 17 upwardly into the mercury chamber 29 and has formed in its upper end a relatively restricted port 35a through which air under pressure may be introduced into the mercury chamber above the level of the upper surface of the body of mercury therein, this body of mercury being indicated at 36. The upper end of the tube is sealed by a suitable sealing member 29 and a port is formed in the base 17, in alignment with the bore of the tube, through which a cleaning tool may be inserted when necessary, this port being normally closed by screw plug 17a.

The partition 28 within the housing is so located that the air chamber 30 has a volume which is substantially eight and one-half times the volume of the mercury space in the tube 23 and said chamber is preferably insulated interiorly by means of a coating of insulating material 37 applied to its side walls and top and to the partition 28. The back 25 previously mentioned is preferably formed in two layers the innermost of which, indicated at 38, is a layer of insulating material, the intent being to so insulate the air chamber 30 from the atmosphere that changes in volume of its contained air, due to changes in temperature of the atmosphere surrounding, will occur only very slowly. This makes negligible the possibility that the temperature and pressure of the air contained in the instrument may change during the time that a reading is being taken, thus causing error. Obviously, the outer walls 20, 21 and 22 may be fabricated so as to minimize the possibility of rapid heat transfer. Preferably all portions of the housing are formed of plastic, transparent plastic if desired, so as to be durable, attractive in appearance, and resistant to the collection of dust or dirt on its surface.

Normally, when not in use, the housing 12 will be tilted downwardly within the compartment 14b and the case 12 will rest in a horizontal position upon a table or disc. When in this condition the mercury body 36 will be as shown in Figure 4, the lower end of the tube 23 being uncovered and likewise the aperture 35a in the end of tube 35. Hence the air chamber 30 is in communication with the outside atmosphere and the air pressure therein will be the same as the outside atmosphere. When the housing is tilted to vertical position, however, the body of mercury 36 then rests upon the bottom 17 of the instrument, sealing off the lower end of the tube 23. When pressure is created in the mercury chamber by the forcing in of air under pressure through the duct 35 the mercury will be forced upwardly in the tube 23. As it rises it displaces the air which has previously occupied the tube and causes it to flow through the minor apertures 31 into the air chamber, the air in this chamber being gradually compressed as the mercury rises. Because of the existence of this air pressure, opposing the upward movement of the mercury, the mercury column itself will not rise as high as it otherwise would for any given use of the instrument. The graduations 24, however, are carefully calibrated so that the actual reading of the upper surface of the mercury column will truly indicate the patient's blood pressure. Fluctuations in position of the upper surface of the mercury column will likewise be opposed by the damping action of the compressed air above it, which is highly advantageous.

Having thus described the invention, what is claimed as new and desired to be secured by Letters Patent is:

1. A sphygmomanometer comprising in combination, a mercury chamber having a duct in the wall thereof through which the interior of the chamber may communicate with the surrounding atmosphere and through which air under pressure may be introduced into the chamber, a tube projecting into said chamber the end of which within the chamber is open and is spaced from the chamber bottom, an air chamber in constant communication with the interior of said tube at a point remote from that end thereof which is located within the mercury chamber, the duct or passage connecting the air chamber and tube permitting the ready flow of air therethrough but preventing the passage of mercury, a body of mercury within the mercury chamber and closing the end of the tube within said chamber when the tube is disposed in operative substantially vertical position, displacement of the mercury bringing the interior of the tube, and the interior of the air chamber, into communication with the mercury chamber, whereby atmospheric pressures in said chambers may be equalized.

2. A sphygmomanometer comprising in combination, a mercury chamber having a duct in the wall thereof through which the interior of the chamber may communicate with the surrounding atmosphere and through which air under pressure may be introduced into the chamber, a tube projecting into said chamber the end of which within the chamber is open and is spaced from the chamber bottom, an air chamber in constant communication with the interior of said tube at a point remote from that end thereof which is located within the mercury chamber, means insulating the wall of said air chamber to prevent sudden change in temperature of air contained therein, a body of mercury within the mercury chamber and closing the end of the tube within said chamber when the tube is disposed in operative substantially vertical position, displacement of the mercury bringing the interior of the tube, and the interior of the air chamber, into communication with the mercury chamber, whereby atmospheric pressures in said chambers may be equalized.

3. A sphygmomanometer comprising in combination, a mercury chamber having a duct in the wall thereof through which the interior of the chamber may communicate with the surrounding atmosphere and through which air under pressure may be introduced into the chamber, said duct having a tubular portion with an open end so located with respect to the chamber walls as to be above the surface of a body of mercury in said chamber at all times, a tube projecting into said chamber the end of which within the chamber is open and is spaced from the chamber bottom, an air chamber in constant communication with the interior of said tube at a point remote from that end thereof which is located within the mercury chamber, a body of mercury within the mercury chamber and closing the end of the tube within said chamber when the tube is disposed in operative substantially vertical position, displacement of the mercury bringing the interior of the tube, and the interior of the air chamber, into communication with the mercury chamber, whereby atmospheric pressures in said chambers may be equalized.

CHARLES B. ROHR.

REFERENCES CITED

The following references are of record in the file of this patent:

UNITED STATES PATENTS

| Number | Name | Date |
|---|---|---|
| 1,821,902 | Baum | Sept. 1, 1931 |
| 1,830,829 | Eyster | Nov. 10, 1931 |
| 1,905,782 | Amdursky | Apr. 25, 1933 |
| 2,021,280 | Bandoly | Nov. 19, 1935 |

FOREIGN PATENTS

| Number | Country | Date |
|---|---|---|
| 518,182 | France | Sept. 19, 1924 |